No. 832,318. PATENTED OCT. 2, 1906.
D. HUMPHREY.
BRAKE MECHANISM FOR ELEVATED CARS.
APPLICATION FILED AUG. 30, 1905.
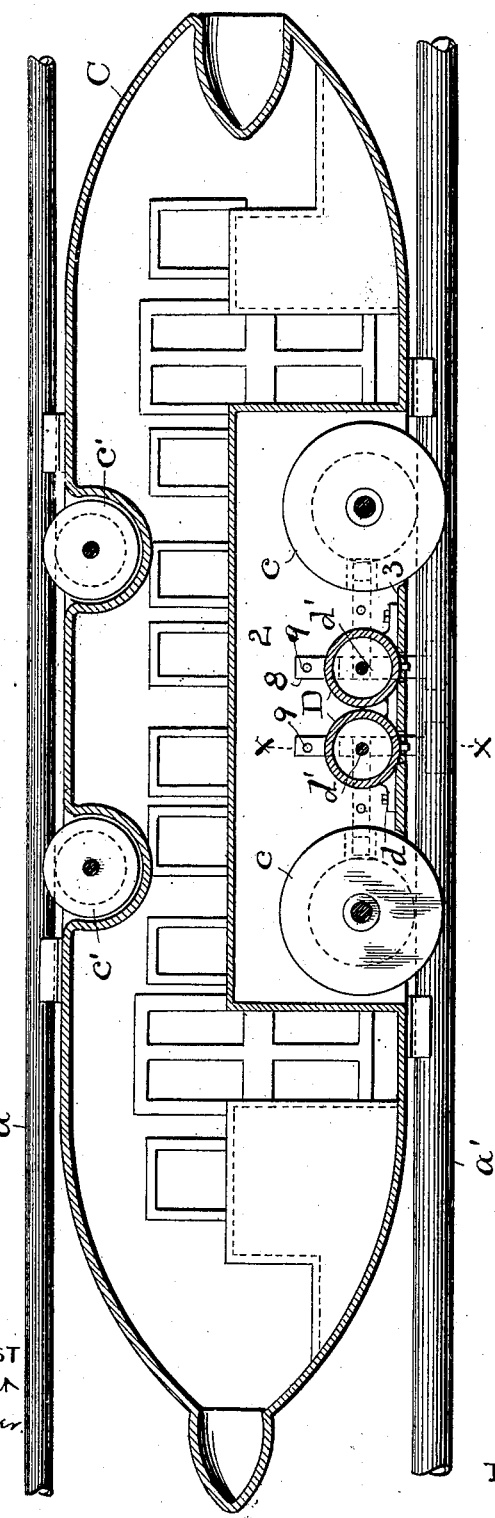
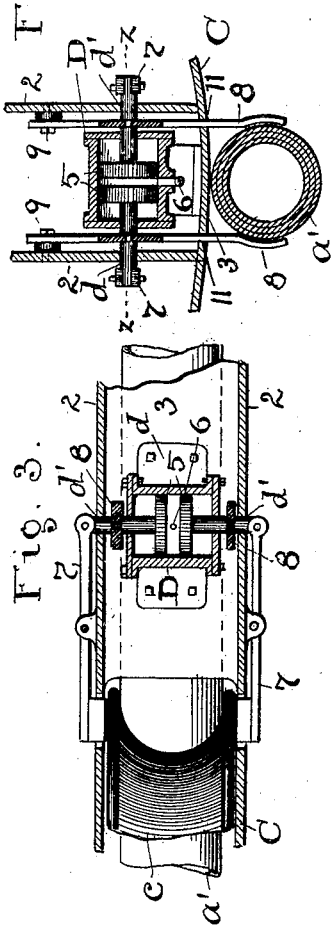
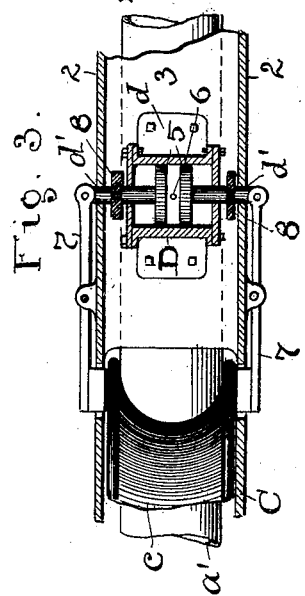
INVENTOR.
DAVID HUMPHREY.
ATTEST
BY H. J. Fisher ATTY.

UNITED STATES PATENT OFFICE.

DAVID HUMPHREY, OF CLEVELAND, OHIO.

BRAKE MECHANISM FOR ELEVATED CARS.

No. 832,318.     Specification of Letters Patent.     Patented Oct. 2, 1906.

Original application filed May 18, 1904, Serial No. 208,542. Divided and this application filed August 30, 1905. Serial No. 276,397.

*To all whom it may concern:*

Be it known that I, DAVID HUMPHREY, a citizen of the United States, residing at Cleveland, in the county of Cuyahoga and State of Ohio, have invented certain new and useful Improvements in Brake Mechanism for Elevated Cars; and I do declare that the following is a full, clear, and exact description of the invention, which will enable others skilled in the art to which it appertains to make and use the same.

My invention relates to improvements in brake mechanism for elevated cars, and is a division of an application filed by me on the 18th day of May, 1904, Serial No. 208,542. Furthermore, the car-body shown herein is the subject-matter of an application filed concurrently herewith and bearing Serial No. 276,396.

In the accompanying drawings, Figure 1 is a longitudinal central sectional elevation of a car or car-body containing my invention and illustrated in connection with top and bottom tracks carrying the car and understood to be a portion of an elevated structure or frame. Fig. 2 is a cross-section of a central lower inner portion of the car or car-body and the tracks therefor on a line corresponding substantially to $x\,x$, Fig. 1, and showing one portion of the brake mechanism in sectional elevation. Both said mechanisms are alike, and one or more may be used. Fig. 3 is a horizontal section on line $z\,z$, Fig. 2.

The principal idea of the invention herein is to provide an effective and simple pneumatic or other fluid brake for a car of this general kind and adapted to engage upon the side or sides of a tubular or cylindrical track or rail and on the traction-wheels of the car simultaneously, thus providing a compound brake which can be made very effective in emergencies. To these ends C represents the car, which is shown in this instance as of a projectile pattern and is provided at its vertical center or axis with carrying or traction wheels $c$ at its bottom and guide-wheels $c'$ at its top and adapted to run on tracks or rails $a$ and $a'$, respectively, above and below. The lower wheels $c$ especially are set up in the car-body some distance, so as to bring the body or car down near to its track. This makes it convenient also to apply my new and improved brake mechanism to the car and to engage the same operatively with the track upon which the car runs and with the corresponding traction-wheels $c$, as will now appear. Thus I employ fluid-cylinders D, one or more, and two are shown in this instance with similar brake mechanism. The said cylinders are supported between the side walls 2 of a boxing built longitudinally in the bottom of the car more especially for accommodating wheels $c$, but in this instance having a floor 3 between said wheels to which the base $d$ of the brake-operating cylinders D is attached. However, any preferred or available way of fixing the position of said cylinders may be adopted. Within each cylinder are two separate pistons 5, set face to face with a fluid-pressure inlet 6 between them, and each piston has its own shaft or stem $d'$ provided with a close bearing in the end of the cylinder and constructed outside the cylinder to make operative engagement with brake-lever 7 for traction-wheels $c$ and brake-shoes 8 for engagement with the track-rail $a'$. Here also there is latitude for adaptation and arrangement of one kind or another to get the desired operative effects, and in this instance as one way of arranging the parts I pivot levers 7 at their middle on the outside of walls 2 and engage wheels $c$ by the ends of said levers through holes in said walls, the other ends being pivotally connected with the ends of piston shafts or stems $d'$. The track or rail brakes or shoes 8 also are engaged on shafts $d'$ outside cylinder D, but inside walls 2, and are shown as fastened in this instance in the bottom of the boxing at 9 and curved at their lower end to conform substantially to the curvature of tracks $a'$ in cross-section. Brakes 8 are of spring metal and slidingly contact with the sides of slots 11 in bottom 3. Now having available the brakes thus described and located and suitable means to operate the same, whether the exact mechanism shown or its equivalent in function, it will be seen that as fluid under pressure enters cylinder D through opening 6 it will cause pistons 5 to move outward away from each other toward the ends of the cylinder. This will cause both sets of brakes 7 and 8 on both sides to operate at the same time, throwing both into frictional braking engagement with wheel $c$ and track $a'$, respectively. Then as the fluid-pressure is withdrawn the said parts are thrown back out of frictional contact by their spring reaction. If a single cylinder D were used instead of two, as herein shown, the two levers 7 at each side for the respective wheels c, front and rear, could be attached to the same end of piston-stem d'.

Obviously either the brakes 7 or the brakes 8 could be omitted; but my invention comprises both.

What I claim is—

A brake mechanism for cars comprising two sets of brakes, one for the car-wheels and the other for a car-track, in combination with a fluid motive device to actuate said brakes comprising a suitable cylinder and oppositely-movable pistons adapted to actuate said brakes simultaneously, each set of brakes having actuating connection with the outer ends of the stems of said pistons and arranged at right angles to each other.

In testimony whereof I sign this specification in the presence of two witnesses.

DAVID HUMPHREY.

Witnesses:
R. B. MOSER,
C. A. SELL.